United States Patent
Kim et al.

(10) Patent No.: US 8,406,022 B2
(45) Date of Patent: Mar. 26, 2013

(54) APPARATUS AND METHOD FOR CONTROLING POWER QUALITY OF POWER GENERATION SYSTEM

(75) Inventors: Tae Hoon Kim, Gyunggi-do (KR); Jae Hyung Kim, Gyunggi-do (KR); Jun Gu Kim, Gyunggi-do (KR); Yong Hyok Ji, Gyunggi-do (KR); Chung Yuen Won, Gyunggi-do (KR); Doo Young Song, Gyunggi-do (KR); Byoung Kuk Lee, Gyunggi-do (KR); Dong Seong Oh, Incheon (KR); Tae Won Lee, Gyunggi-do (KR); Jin Wook Kim, Seoul (KR)

(73) Assignees: Samsung Electro-Mechanics Co., Ltd., Gyunggi-do (KR); Sungkyunkwan University Foundation for Corporate Collaboration, Gyunggi-do (KR)

( * ) Notice: Subject to any disclaimer, the term of this patent is extended or adjusted under 35 U.S.C. 154(b) by 339 days.

(21) Appl. No.: 12/906,425

(22) Filed: Oct. 18, 2010

(65) Prior Publication Data

US 2011/0255307 A1    Oct. 20, 2011

(30) Foreign Application Priority Data

Apr. 16, 2010   (KR) .................. 10-2010-0035293
Aug. 18, 2010   (KR) .................. 10-2010-0079988

(51) Int. Cl.
*H02M 3/24* (2006.01)
(52) U.S. Cl. ........................................ 363/95
(58) Field of Classification Search .............. 363/55, 363/56.01, 95, 97, 131, 149, 164, 165
See application file for complete search history.

(56) References Cited

U.S. PATENT DOCUMENTS

| 7,193,872 B2 * | 3/2007 | Siri ................................. 363/95 |
| 7,465,872 B1 * | 12/2008 | de Rooij et al. ................ 136/243 |
| 2010/0208501 A1 * | 8/2010 | Matan et al. ..................... 363/95 |
| 2011/0261593 A1 * | 10/2011 | Pan et al. ................... 363/21.02 |

FOREIGN PATENT DOCUMENTS

| JP | 2008-306829 A | 12/2008 |
| JP | 2009-044897 A | 2/2009 |

OTHER PUBLICATIONS

KR Office Action for 10-2010-0079988 dated Aug. 19, 2011.

\* cited by examiner

*Primary Examiner* — Matthew Nguyen
(74) *Attorney, Agent, or Firm* — Lowe Hauptman Ham & Berner, LLP

(57) ABSTRACT

There are provided an apparatus and a method for controlling the power quality of a power generation system. According to the present invention, there is provided an apparatus for controlling the power quality of a power generation system including a DC/AC inverter converting DC voltage into AC voltage and supplying inverter current to a grid, including: a grid voltage phase follower generating a grid signal; a fundamental extractor extracting a magnitude of a fundamental wave of a load current introduced into a non-linear load connected between the DC/AC inverter and the grid; a first calculator subtracting a preset current compensation value from the magnitude of the fundamental wave from the fundamental extractor; and a second calculator generating an inverter current instruction value for the DC/AC inverter by using the output value of the first calculator and the grid signal and the load current from the grid voltage phase follower.

20 Claims, 12 Drawing Sheets

APPARATUS AND METHOD FOR CONTROLING POWER QUALITY OF POWER GENERATION SYSTEM

CROSS-REFERENCE TO RELATED APPLICATIONS

This application claims the priority of Korean Patent Application Nos. 10-2010-0035293 filed on Apr. 16, 2010 and 10-2010-0079988 filed on Aug. 18, 2010, in the Korean Intellectual Property Office, the disclosure of which is incorporated herein by reference.

BACKGROUND OF THE INVENTION

1. Field of the Invention

The present invention relates to an apparatus and method for controlling the power quality applicable to a power conditioning system, such as a solar power generation system, or the like, and more particularly, to an apparatus and method for controlling the power quality of a power generation system capable of compensating for harmonic distortions due to non-linear loads and improving power quality accordingly, by performing an active power filter function regardless of whether or not the power generation system performs power generation.

2. Description of the Related Art

Generally, electronic products such as computers, communications devices, medical devices, military devices, or the like, have loads sensitive to power quality. Since these industrial, commercial and military loads are operated by being connected to each other during an automatic process, a power generation system connected to these loads has been very sensitive to power quality PQ.

Generally, as products having non-linear load characteristics may have a bad effect on the power quality of the power generation system, there are products having adjustable speed drive (ASD), switching mode power supply, arc furnace, or the like, mounted therein.

Meanwhile, power quality is classified into voltage quality and current quality. First, in the case of voltage quality, factors, such as instantaneous voltage sags/swells, under/over voltage, interruptions, noise, and other factors such as DC offset, harmonics, interharmonics, notching, or the like, voltage imbalance, voltage fluctuation/flicker, or the like, are handled. These factors, degrading the voltage quality, may be causes of malfunctions or defaults within electrical and electronic devices. When these states occur, dielectric breakdown, device loss, the deletion of memory data of a controller, changes in lighting brightness, shutdowns or resetting of devices, overheating of motors, transformers, and wiring, or the like, may be caused in various facilities.

Next, as the current quality, a default of a power supply, such as voltage distortion in response to current distortion caused due to the increase in the non-linear load, or the like, is handled.

Meanwhile, the power generation system according to the related art cannot compensate for the distortions caused at the time of connecting the non-linear loads and may cause a trip accident or a malfunction in sensitive loads by generating a voltage drop in a pulse type due to the flowing of a pulse-type current into an AC power generation system and line impedance of a power division network, when the non-linear loads are connected.

Therefore, there are problems in that a distribution current transformer causes an increase in operation loss to overheat the transformer and shorten the lifespan thereof and is broken due to resonance between adjacent distribution systems occurring in 5-order and 7-order voltage harmonics.

SUMMARY OF THE INVENTION

As an aspect of the present invention, an apparatus and method for controlling the power quality of a power generation system capable of compensating for harmonic distortions due to non-linear loads and improving power quality accordingly, by performing an active power filter function regardless of whether or not the power generation system performs power generation is provided.

According to an aspect of the present invention, there is provided an apparatus for controlling the power quality of a power generation system including a DC/AC inverter converting DC voltage into AC voltage and supplying inverter current to a grid, including: a grid voltage phase follower generating a grid signal having a phase of the grid voltage; a fundamental extractor extracting a magnitude of a fundamental wave of a load current introduced into a non-linear load connected between the DC/AC inverter and the grid; a first calculator subtracting a preset current compensation value from the magnitude of the fundamental wave from the fundamental extractor; and a second calculator generating an inverter current instruction value for the DC/AC inverter by using the output value of the first calculator and the grid signal and the load current from the grid voltage phase follower.

According another aspect of the present invention, there is provided an apparatus for controlling the power quality of a power generation system including a DC/AC inverter converting DC voltage into AC voltage and supplying inverter current to a grid, including: a grid voltage phase follower generating a grid signal having a phase of the grid voltage; a fundamental extractor extracting a magnitude of a fundamental wave of a load current introduced into a non-linear load connected between the DC/AC inverter and the grid; a first calculator subtracting a preset current compensation value from the magnitude of the fundamental wave from the fundamental extractor; a second calculator generating an inverter current instruction value for the DC/AC inverter by using the output value of the first calculator and the grid signal and the load current from the grid voltage phase follower; and a controller controlling the DC/AC inverter based on the inverter current instruction value from the second calculator.

The grid voltage phase follower may include: a phase detector detecting the phase of the grid voltage; and a signal generator generating the grid signal having the same phase as the grid voltage and having the preset unit magnitude based on the phase from the phase detector.

The fundamental wave extractor may be implemented by one of the discrete Fourier transform (DFT), a fast Fourier transform (FFT), and the Goertzel algorithm using the discrete Fourier transform to extract the fundamental wave from the load current and detect the magnitude of the extracted fundamental wave.

The second calculator may include: a multiplier multiplying an output value of the first calculator by the grid signal from the grid voltage phase follower; and a subtracter subtracting the output signal of the multiplier from the load current to generate the inverter current instruction value.

According to another aspect of the present invention, there is provided a method for controlling the power quality of a power generation system including a DC/AC inverter converting DC voltage into AC voltage and supplying inverter current to a grid, the method including: a grid signal generating step generating a grid signal having a phase of the grid voltage; a fundamental wave extracting step extracting a magnitude of a fundamental wave of a load current introduced into a non-linear load connected between the DC/AC inverter and the grid; a first operating step subtracting a preset current compensation value from the magnitude of the fundamental wave from the fundamental wave extracting step; and a second operating step generating an inverter current instruction value for the DC/AC inverter by using the output value of the first operating step and the grid signal and the load current from the grid signal generating step.

The grid signal generating step may include: a phase detecting step detecting the phase of the grid voltage; and a signal generating step generating the grid signal having the same phase as the grid voltage and having the preset unit magnitude based on the phase from the phase detecting step.

The fundamental wave extracting step may be implemented by one of the discrete Fourier transform (DFT), a fast Fourier transform (FFT), and the Goertzel algorithm using the discrete Fourier transform to extract the fundamental wave from the load current and detect the magnitude of the extracted fundamental wave.

The second operating step may include: a multiplying step multiplying an output value of the first operating step by the grid signal from the grid signal generating step; and an adding step subtracting the output signal of the multiplying step from the load current to generate the inverter current instruction value.

The method for controlling the power quality of a power generation system may further include a controlling step controlling the DC/AC inverter based on the inverter current instruction value from the second operating step.

The controlling step may include: a current controlling step detecting an inverter current error between the inverter current and the inverter current instruction value from the second operating step; and a PWM controlling step providing a PWM inverter signal for controlling the DC/AC inverter based on the inverter current error from the current controlling step.

The method for controlling the power quality of a power generation system of may further include a voltage controlling step obtaining the voltage error between the DC voltage at the input side of the DC/AC inverter and the preset DC voltage and providing the voltage error as the current compensation value.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
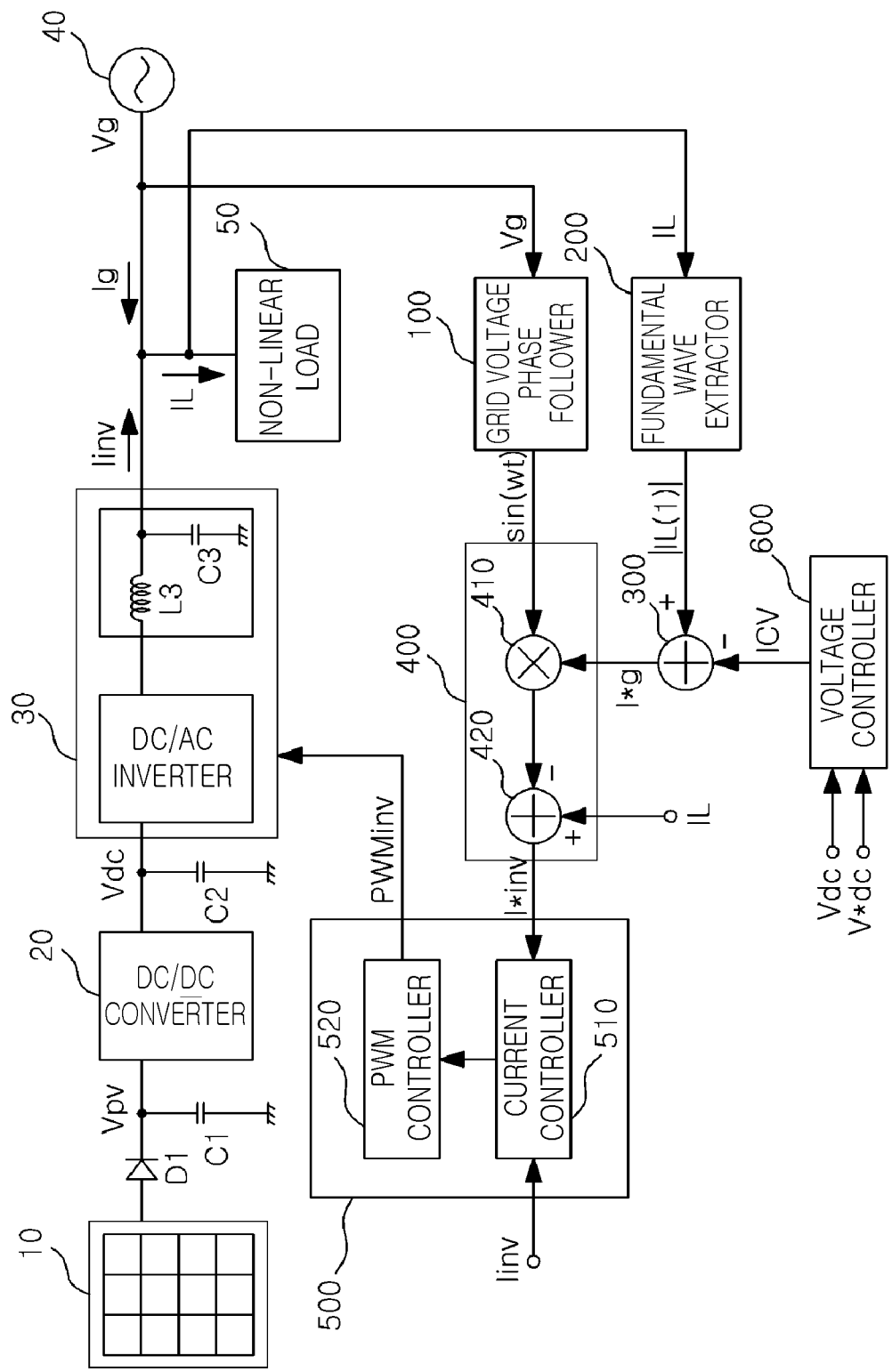
FIG. 1 is a block diagram of an apparatus for controlling the power quality of a power generation system according to the present invention.

Exemplary embodiments of the present invention will now be described in detail with reference to the accompanying drawings.

The present invention should not be limited to the embodiments set forth herein and the embodiments may be used to assist in understanding the technical idea of the present invention. Like reference numerals designate like components having substantially the same constitution and function in the drawings of the present invention.

FIG. 1 is a block diagram of an apparatus for controlling the power quality of a power generation system according to the present invention.

Referring to FIG. 1, a power generation system to which an apparatus for controlling the power quality of the present invention is applied may include a DC/AC inverter 30 that converts DC voltage into AC voltage to supply inverter current Iinv to a grid 40.

In addition, the power generation system to which the apparatus for controlling the power quality of the present invention is applied may include a DC/DC converter 20 that boosts DC voltage Vpv from a solar cell 10 to a predetermined voltage level and follows a maximum power point from the solar cell 10.

The apparatus for controlling the power quality of the present invention applicable to the power generation system may include a grid voltage phase follower 100 that generates a grid signal Sin (wt) having a phase of a grid voltage Vg, a fundamental wave extractor 200 that extracts a magnitude |IL(1)| of a fundamental wave of a load current IL introduced into a non-linear load 50 connected between the DC/AC inverter 30 and the grid 40, a first calculator 300 that subtracts a preset current compensation value ICV from the magnitude |IL(1)| of the fundamental wave from the fundamental wave extractor 200, and a second calculator 400 that generates an inverter current instruction value I*inv for the DC/AC inverter 30 by using the output value of the first calculator 300 and the grid signal and the load current IL from the grid voltage phase follower 100.

Figure 2:
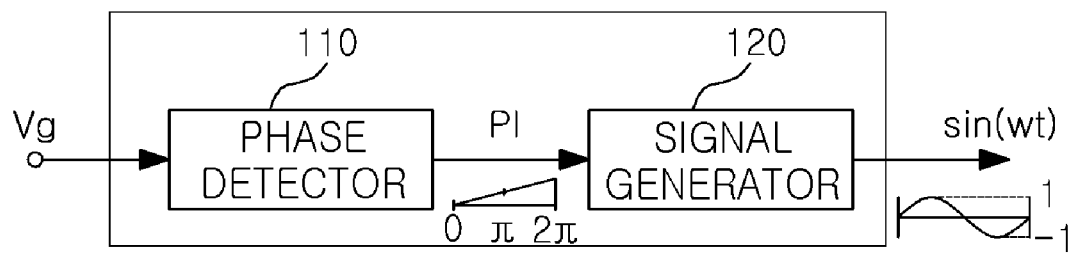
FIG. 2 is a block diagram of a grid voltage phase follower according to the present invention.

FIG. 2 is a block diagram of a grid voltage phase follower according to the present invention.

Referring to FIG. 2, the grid voltage phase follower 100 may include a phase detector 110 that detects a phase PH of the grid voltage Vg and a signal generator 120 that has the same phase as the grid voltage Vg and generates the grid signal Sin (wt) having the preset unit magnitude based on the phase PH from the phase detector 110.

Referring to FIG. 1, the fundamental wave extractor 200 may be implemented by one of the discrete Fourier transform (DFT), a fast Fourier transform (FFT), and the Goertzel algorithm using the discrete Fourier transform. In this case, the fundamental wave extractor 200 may be implemented to extract the fundamental wave from the load current IL and extract the magnitude |IL(1)| of the extracted fundamental wave.

Figure 3:
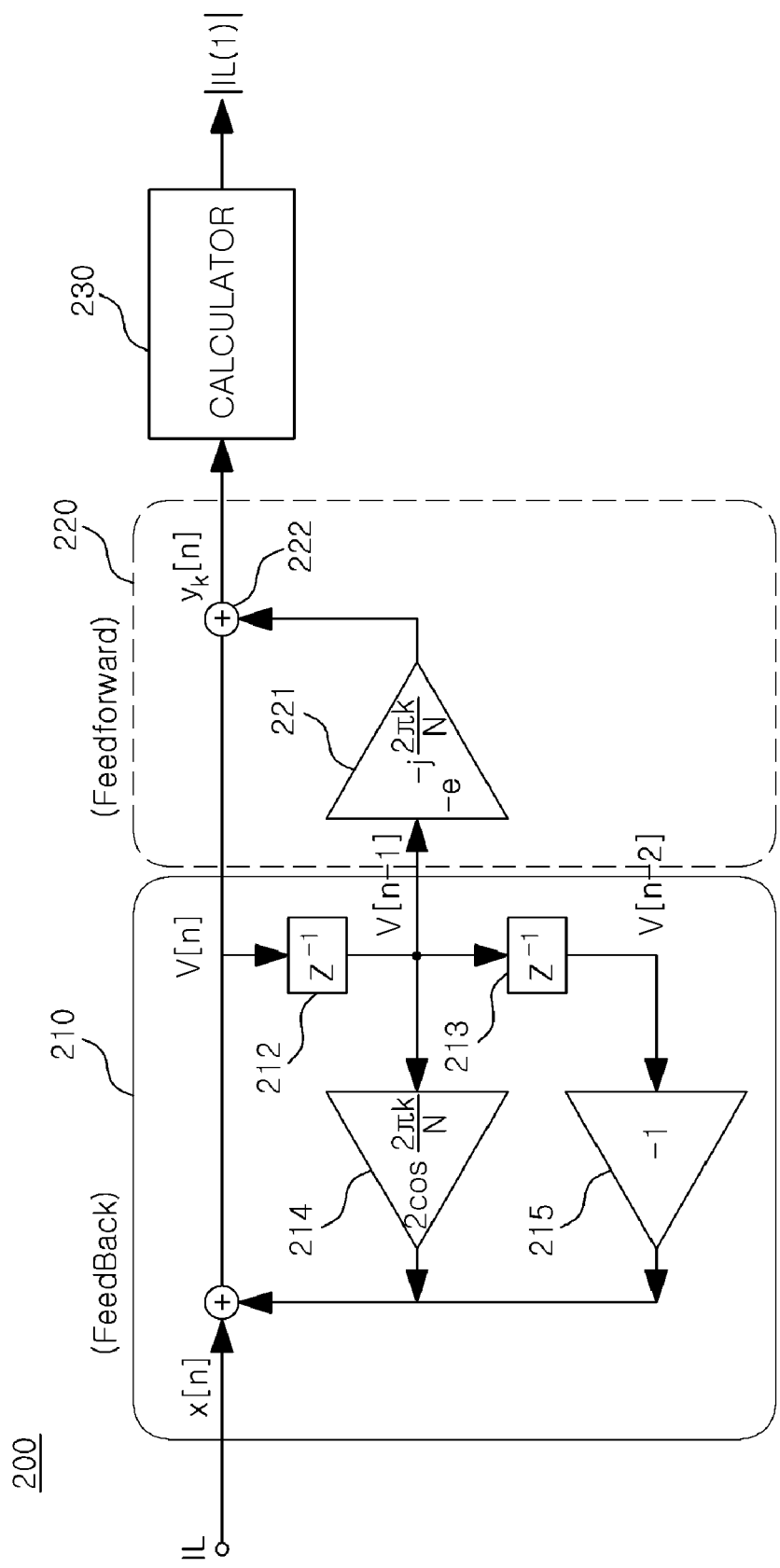
FIG. 3 is an exemplified diagram of a fundamental wave extractor according to the present invention constituted by a Goertzel filter.

FIG. 3 is an exemplified diagram of a fundamental wave extractor constituted by a Goertzel filter.

Referring to FIG. 3, the fundamental wave extractor 200 may be implemented to have a transfer function H(z) including a feedback part (FBP) and a feed forward part (FFP).

In more detail, the fundamental wave extractor 200 may include a preset feedback part (FBP) 210, a preset feedforward part (FFP) 220, and a calculator 230 operation to determine the magnitude of the fundamental wave IL(1) of the load current IL.

The transfer function H(z) may be represented by the following Equation 1. The following Equation 2 represents the relationship between a discrete frequency k and a sampling frequency fs to be extracted and a frequency fint to be extracted. Equations 3, 4, and 5 represent the following Equation 1 as a difference Equation In the following Equations 1 to 5, x[n] represents a place in which a currently input signal sample is stored, v[n] represents a place in which an intermediate result obtained from the current operation is stored, v[n−1] represents a place in which a result obtained from an operation of a previous sampling is stored, v[n−2] is a place in which a result obtained from operation of two previous samplings is stored and y[n] represents a result value of the Goertzel filter.

When the following Equations 3, 4, and 5 are shown as a block diagram according to the above description, it may be represented as shown in FIG. 3.

Figure 4:
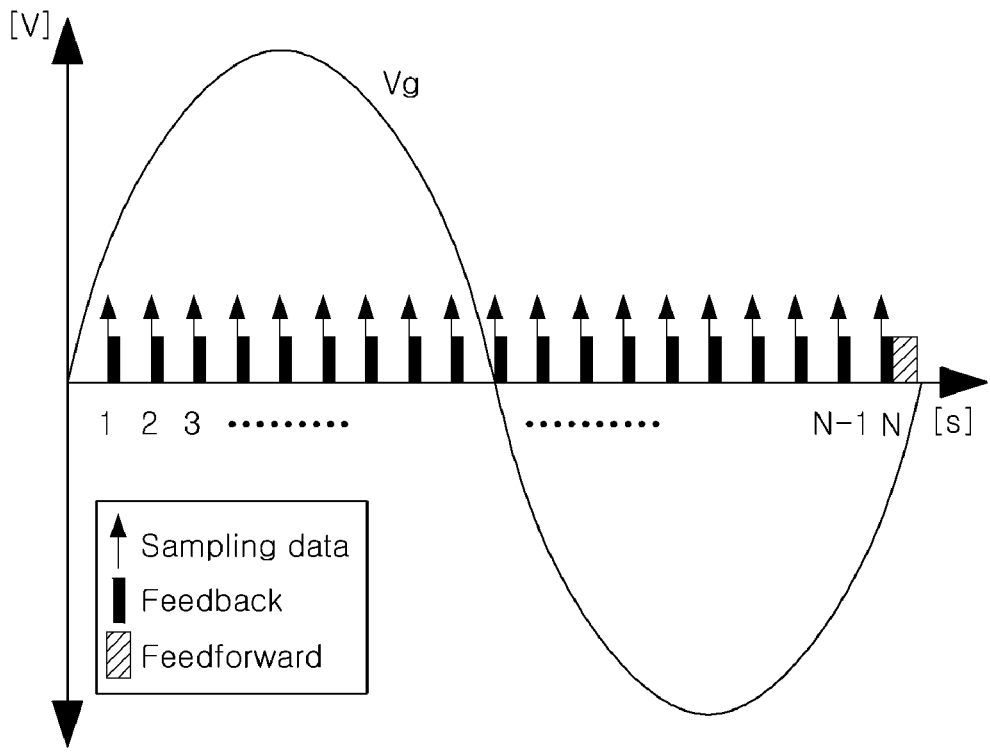
FIG. 4 is a timing waveform diagram of the Goertzel filter of FIG. 3.

FIG. 4 is a timing waveform diagram of the Goertzel filter of FIG. 3. In the timing waveform of FIG. 4, when N samplings are performed for one period of the grid voltage Vg, the feedback part is operated for each sampling, and the feedforward part is operated after N-th feedback number operation ends, the magnitude of the frequency to be extracted may be operated.

In the zero and pole of the Goertzel filter, a zero offsets a pole to leave only one pole as shown in Equation 1. As a result, only a signal corresponding to a discrete frequency k corresponding to the pole passes through the Goertzel filter.

Figure 5:
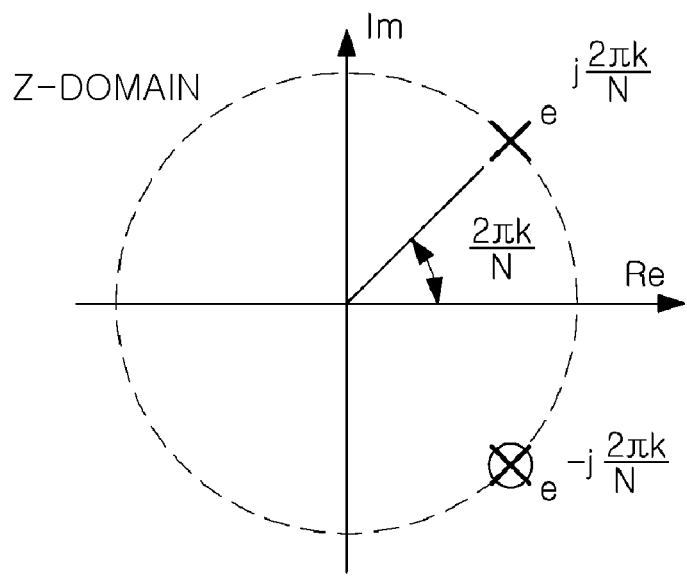
FIG. 5 is a diagram showing a position of a zero and a pole in a Z-domain for the Goertzel filter of FIG. 3.
Figure 6:
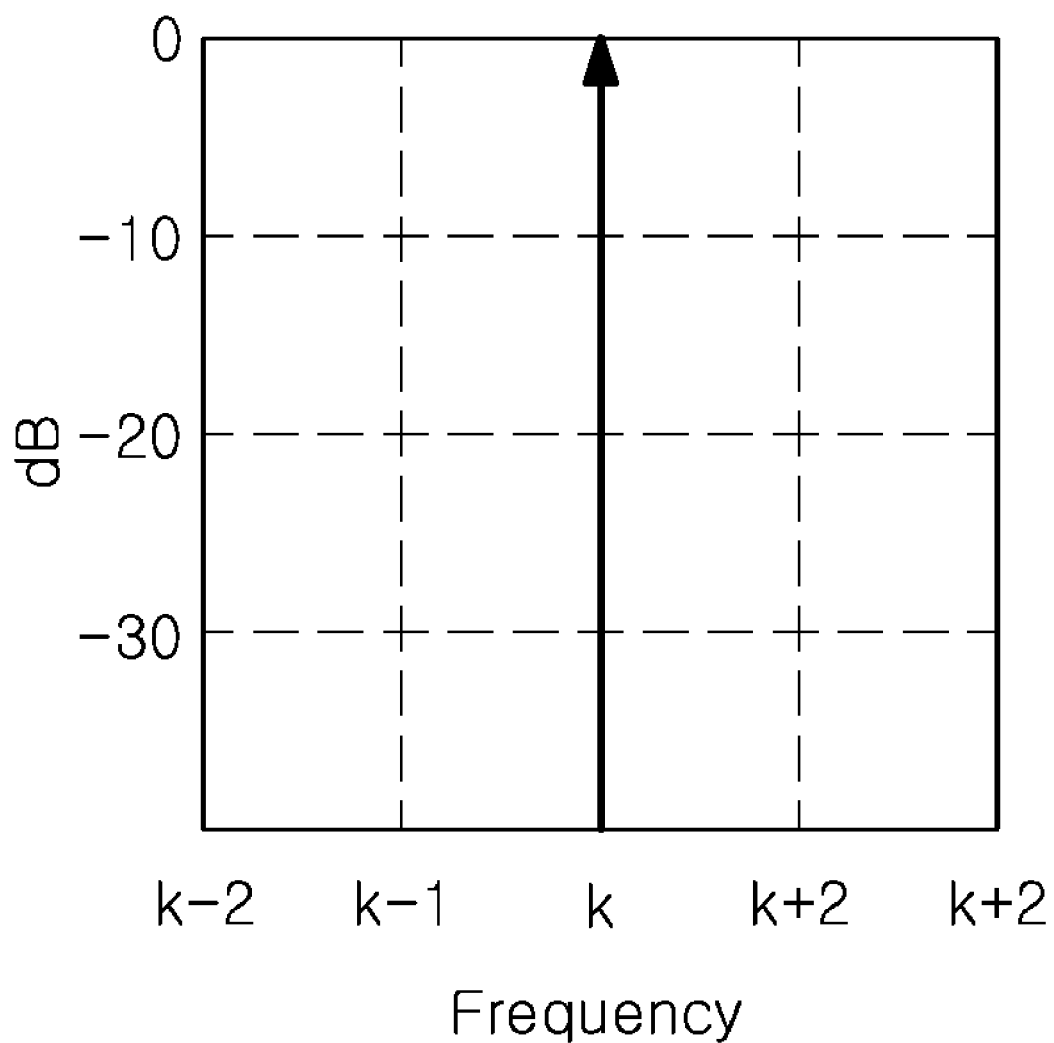
FIG. 6 is a frequency amplitude responding graph for the Goertzel filter of FIG. 3.

FIG. 5 is a diagram showing a position of a zero and a pole in a Z-domain for the Goertzel filter of FIG. 3 and FIG. 6 is a frequency amplitude responding graph for the Goertzel filter of FIG. 3.

Referring to FIGS. 5 and 6, the magnitude of the frequency that may be extracted by the Goertzel filter may be obtained depending on the following Equation 6.

Referring to FIG. 1, a second calculator 400 may include a multiplier 410 that multiples an output value of the first calculator 300 by the grid signal from the grid voltage phase follower 100 and a subtracter 420 that subtracts the output signal of the multiplier 410 from the load current IL to generate the inverter current instruction value I*inv.

In addition, the apparatus for controlling the power quality of the present invention may further include a controller 500 that controls the DC/AC inverter 30 based on the inverter current instruction value I*inv from the second calculator 400 and a voltage controller 600 that obtains a voltage error between a DC voltage Vdc at an input side of the DC/AC inverter 30 and the preset DC voltage instruction value V*dc and provides the voltage error as the current compensation value ICV. In this case, the voltage controller 600 controls a DC-link voltage.

The controller 500 may include a current controller 510 that detects an inverter current error between the inverter current Iinv and the inverter current instruction value I*inv from the second calculator 400 and a PWM controller 520 that provides a PWM inverter signal PWMinv for controlling the DC/AC inverter 30 based on the inverter current error from the current controller 510.

Figure 7:
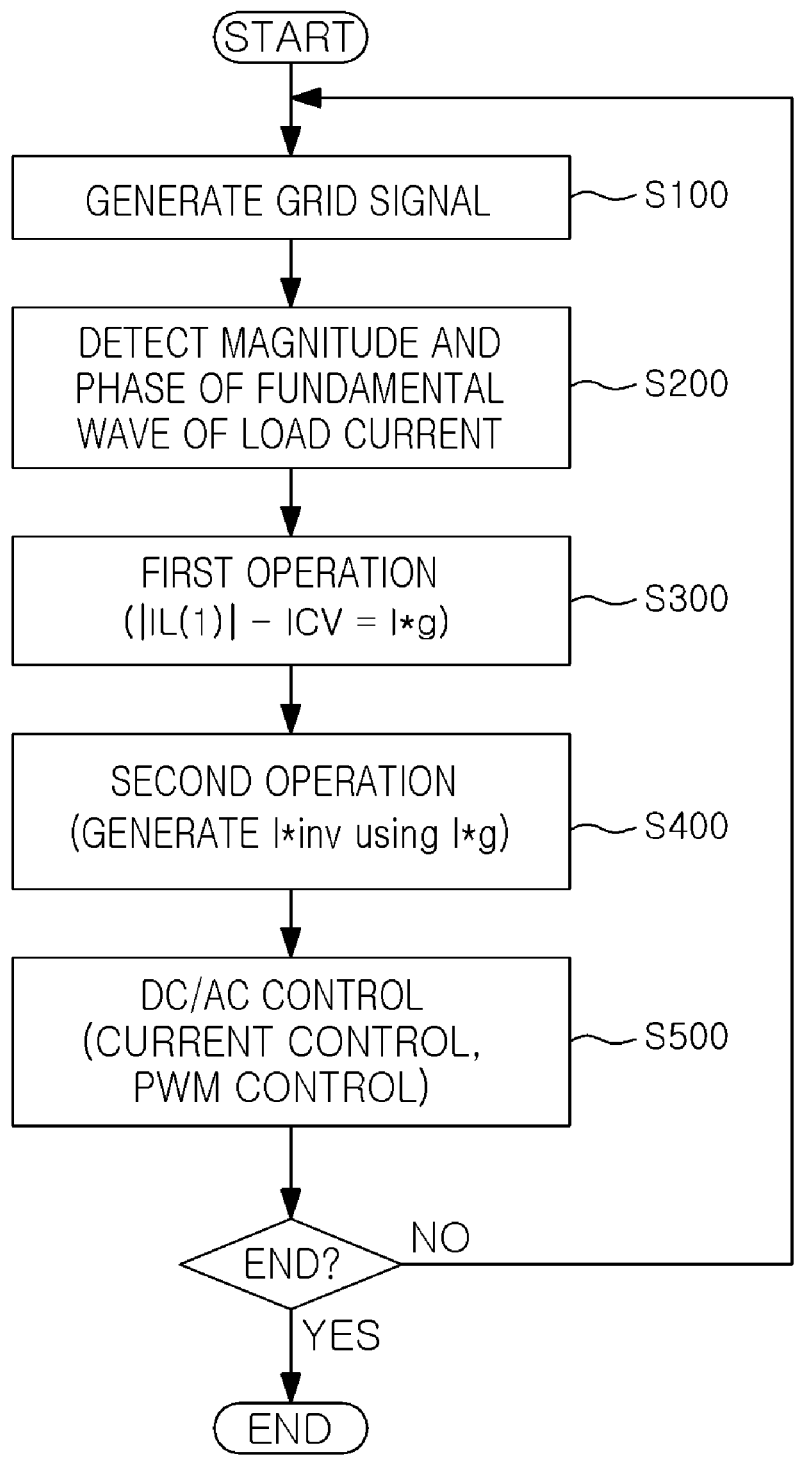
FIG. 7 is a flow chart of a method for controlling the power quality of a power generation system according to the present invention.

FIG. 7 is a flow chart of a method for controlling the power quality of a power generation system according to the present invention.

Referring to FIGS. 1 and 7, a power generation system to which a method for controlling the power quality of the present invention is applied may include the DC/AC inverter 30 that converts DC voltage into AC voltage to supply the inverter current Iinv to the grid 40.

In addition, the power generation system to which the method for controlling the power quality of the present invention is applied may include the DC/DC converter 20 that boosts the DC voltage Vpv from the solar cell 10 to a predetermined voltage level and follows a maximum power point from the solar cell 10.

The method for controlling the power quality of the present invention applicable to the power generation system may include a grid signal generating step (S100) that generates the grid signal Sin(wt) having the phase of the grid voltage Vg, a fundamental wave extracting step (S200) that extracts a magnitude |IL(1)| of a fundamental wave of a load current IL introduced into a non-linear load 50 connected between the DC/AC inverter 30 and the grid 40, a first operating step (S300) that subtracts a preset current compensation value ICV from the magnitude |IL(1)| of the fundamental wave from the fundamental wave extractor 200, and a second operating step (S400) that generates an inverter current instruction value I*inv for the DC/AC inverter 30 by using the output value of the first operating step (S300) and the grid signal and the load current IL from the grid signal generating step (S100).

Figure 8:
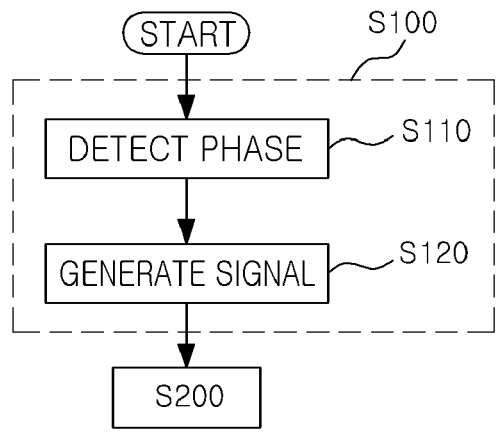
FIG. 8 is a flow chart of a grid signal generating step according to the present invention.

FIG. 8 is a flow chart of a grid signal generating step according to the present invention.

Referring to FIG. 8, the grid signal generating step (S100) may include a phase detecting step (S110) that detects a phase PH of the grid voltage Vg and a signal generating step (S120) that has the same phase as the grid voltage Vg and generates the grid signal Sin (wt) having the preset unit magnitude based on the phase PH from the phase detecting step (S110).

Figure 9:
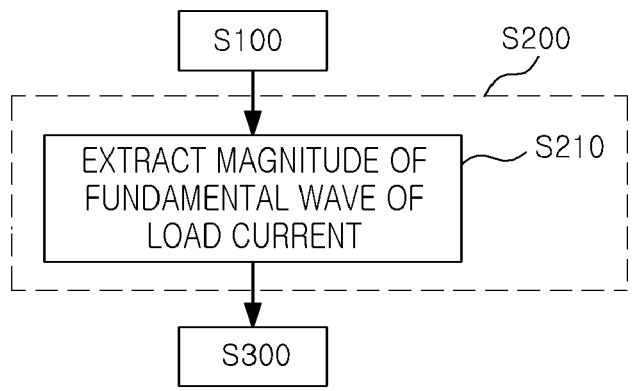
FIG. 9 is a flow chart of a fundamental wave extracting step according to the present invention.

FIG. 9 is a flow chart of a fundamental wave extracting step according to the present invention.

Referring to FIG. 9, the fundamental wave extracting step (S200) may be performed by the Goertzel algorithm using the discrete Fourier transform DFT and may be performed to extract the fundamental wave from the load current IL and extract the magnitude |IL(1)| of the extracted fundamental wave.

The fundamental wave extracting step (S200) may be performed to have the transfer function Hz as represented by the above Equation 1. In this case, the fundamental wave extracting step S200 may be performed to detect the magnitude of the fundamental wave IL(1) of the load current IL.

Figure 10:
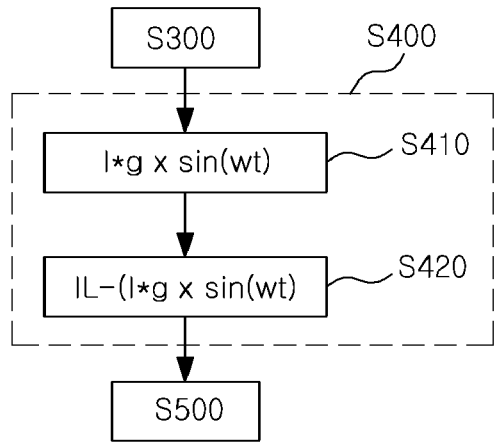
FIG. 10 is a flow chart of a second operating step according to the present invention.

FIG. 10 is a flow chart of a second operating step according to the present invention.

Referring to FIG. 10, the second operating step (S400) may include a multiplying step (S410) that multiplies the output value of the first operating step (S300) by the grid signal from the grid signal generating step (S100) and an adding step (S420) that subtracts the output signal of the multiplying step (S410) from the load current IL to generate the inverter current instruction value I*inv.

In addition, the method for controlling the power quality of the present invention may further include a controlling step (S500) that controls the DC/AC inverter 30 based on the inverter current instruction value I*inv from the second operating step (S400) and a voltage controlling step (S600) that obtains a voltage error between the DC voltage Vdc at the input side of the DC/AC inverter 30 and the preset DC voltage instruction value V*dc and provides the voltage error as the current compensation value ICV.

The controlling step (S500) may include a current controlling step (S510) that detects an inverter current error between the inverter current Iinv and the inverter current instruction value I*inv from the second operating step (S400) and a PWM controlling step (S520) that provides a PWM inverter signal PWMinv for controlling the DC/AC inverter 30 based on the inverter current error from the current controlling step (S510).

Figure 11:
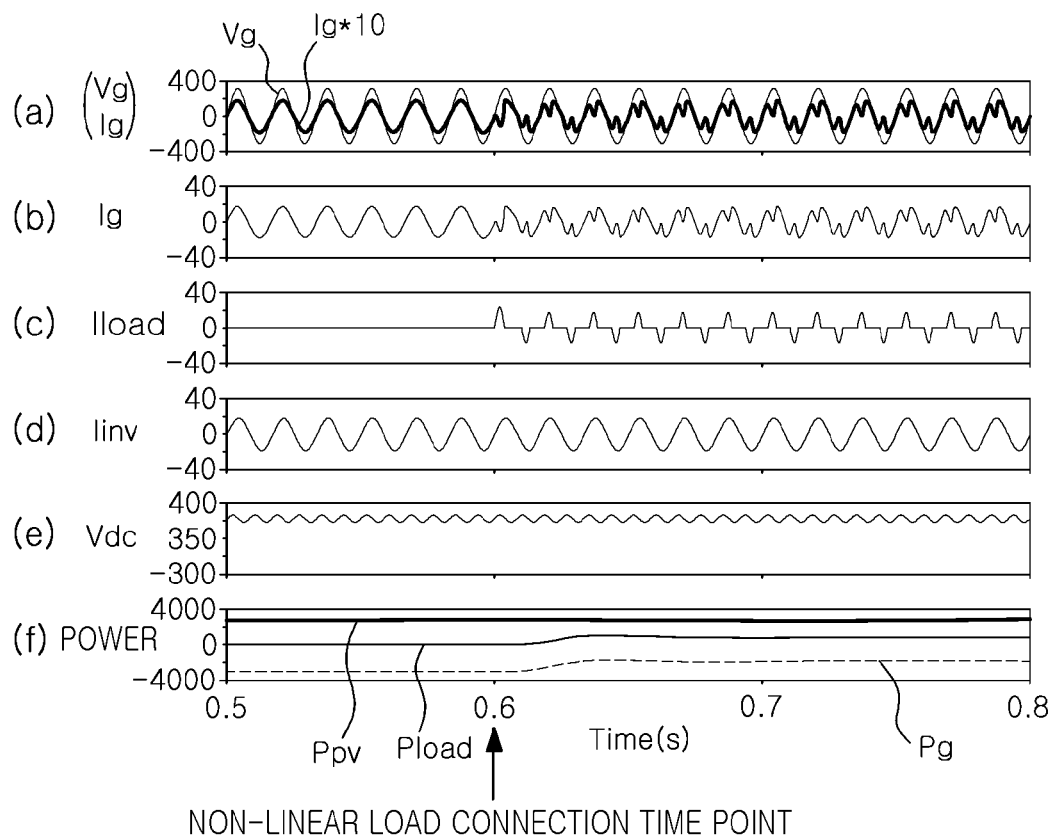
FIG. 11 is a main waveform diagram at the time of connecting non-linear loads to an existing power generation system.
Figure 12:
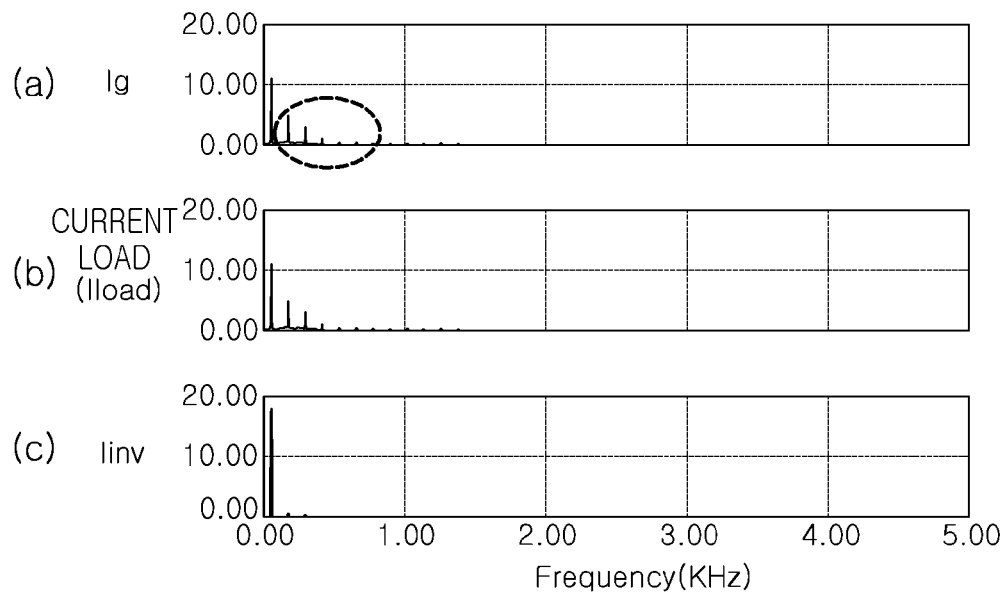
FIG. 12 is a graph showing the results of analyzing frequency components for each current of the existing power generation system.

FIG. 11 is a main waveform diagram at the time of connecting the non-linear loads to the existing power generation system in the case where insolation is present and FIG. 12 is a graph showing the results of analyzing frequency components of each current for the existing power generation system when insolation is present.

In FIGS. 11 and 12, Vg is a grid voltage, Ig is a grid current, Iload is a load current, Iinv is an inverter current, Vdc is an inverter input voltage, Pg is a grid power, Pload is a load power, and Ppv is a solar cell power.

FIGS. 11 and 12 show that total harmonic distortion (THD) is increased due to the distortion of the grid current and the load current at the time of connecting the non-linear loads to deteriorate the power quality.

Figure 13:
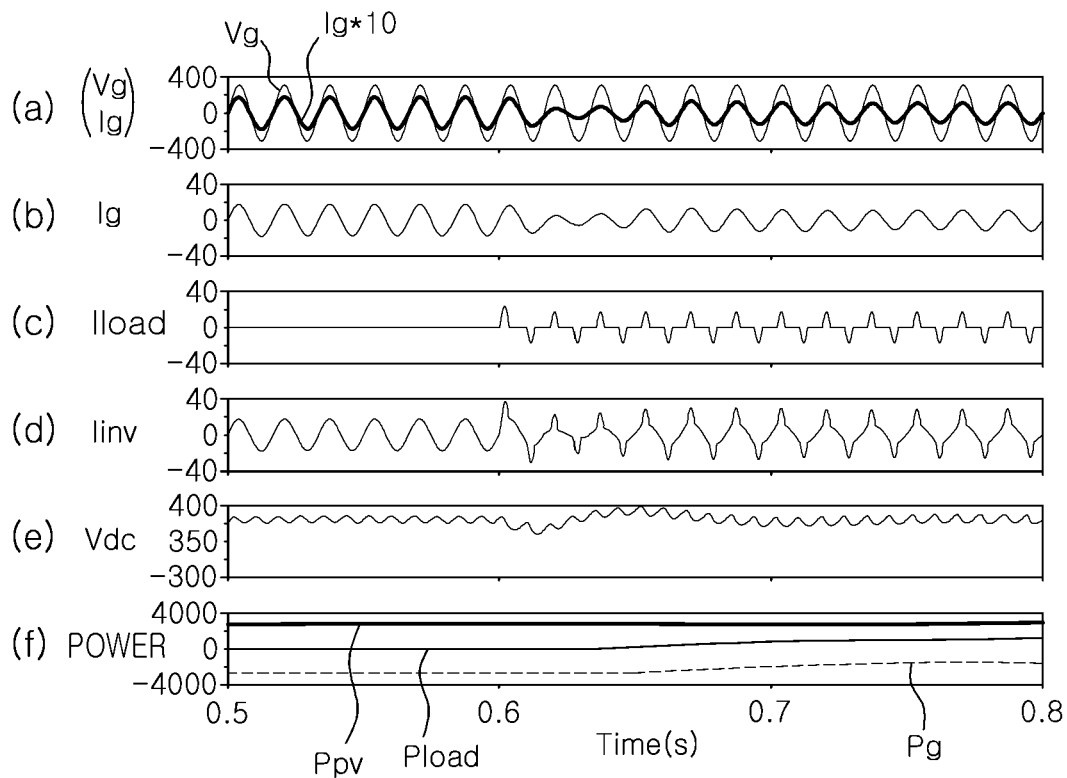
FIG. 13 is a main waveform diagram of a power generation system according to the present invention.
Figure 14:
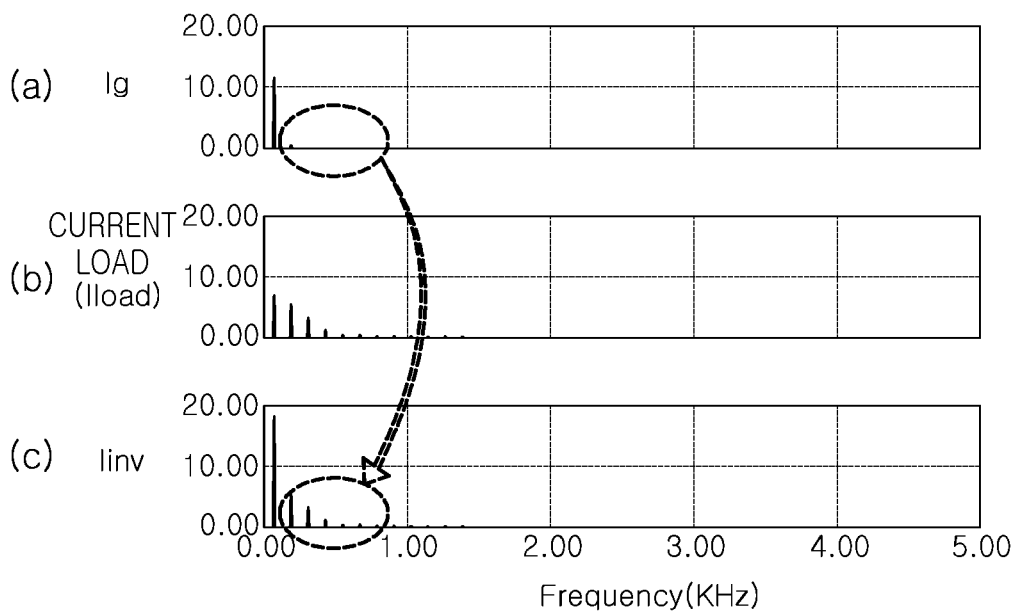
FIG. 14 is a graph showing the results of analyzing frequency components for each current of a power generation system according to the present invention.
Figure 15:
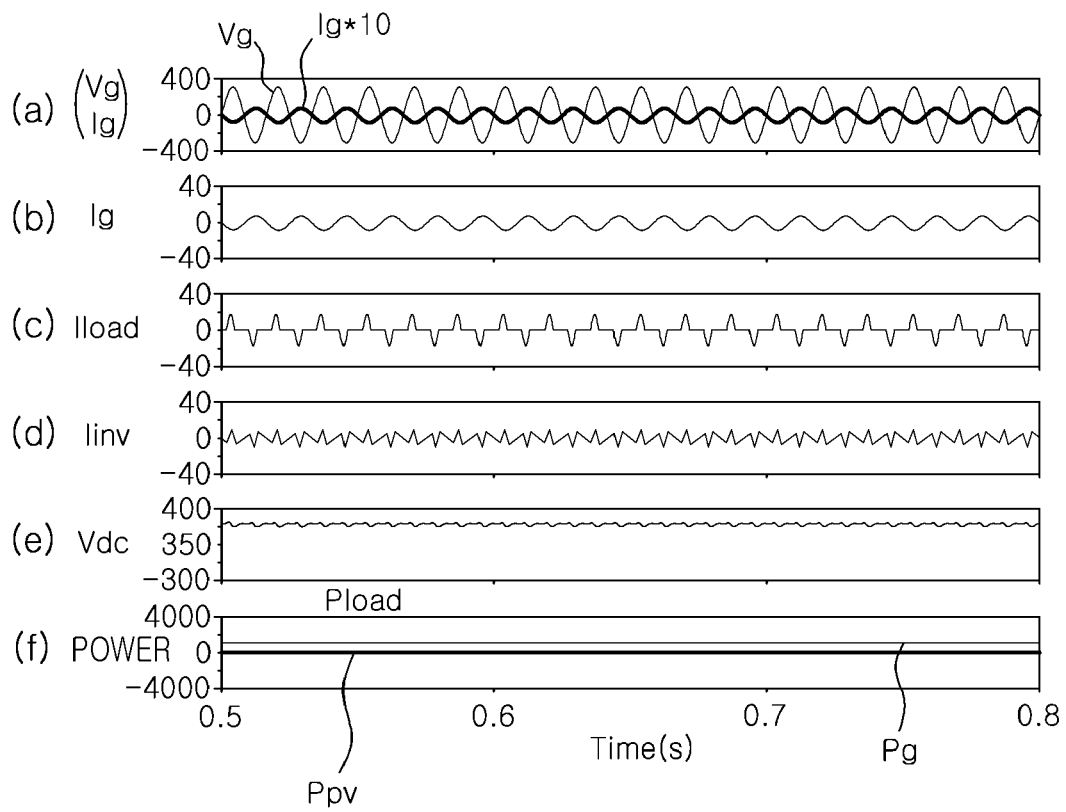
FIG. 15 is a main waveform diagram of the power generation system according to the present invention.
Figure 16:
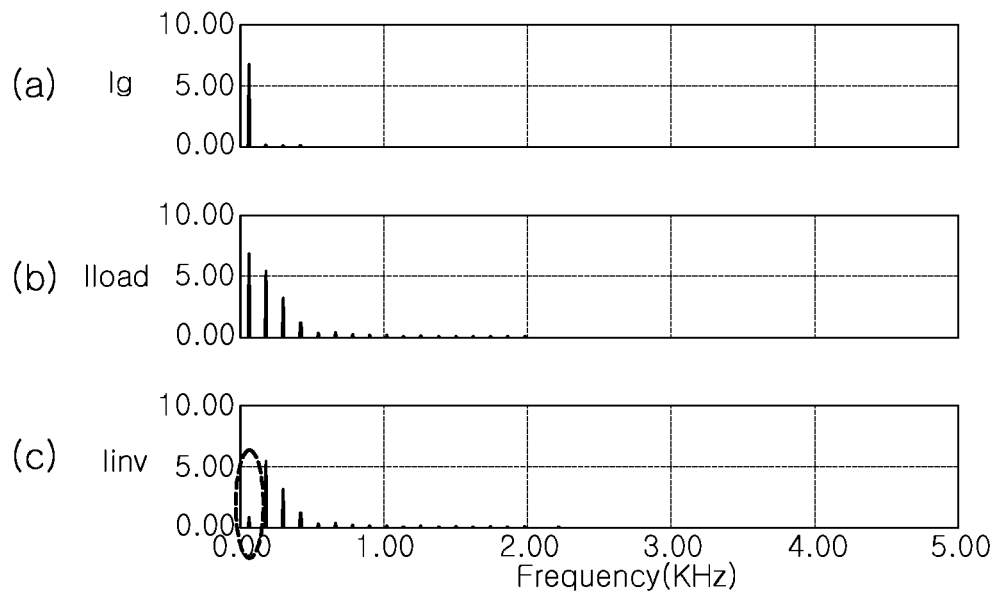
FIG. 16 is a graph showing the results of analyzing frequency components for each current of the power generation system according to the present invention.

FIG. 13 is a main waveform diagram of the power generation system according to the present invention in the case in which insolation is present, FIG. 14 is a graph showing the results of analyzing frequency components of each current for the power generation system of the present invention in the case in which insolation is present, and FIG. 15 is a main waveform diagram of the power generation system of the present invention when insolation is absent. FIG. 16 is a graph showing the results of analyzing frequency components for each current of the power generation system according to the present invention when insolation is absent.

In FIGS. 13 to 16, Vg is a grid voltage, Ig is a grid current, Iload is a load current, Iinv is an inverter current, Vdc is an inverter input voltage, Pg is a grid power, Pload is a load power, and Ppv is a solar cell power.

In FIGS. 13 to 16, according to the present invention, the distortion does not occur in the grid current at the time of connecting the non-linear loads, such that the power quality is not degraded.

Figure 17:
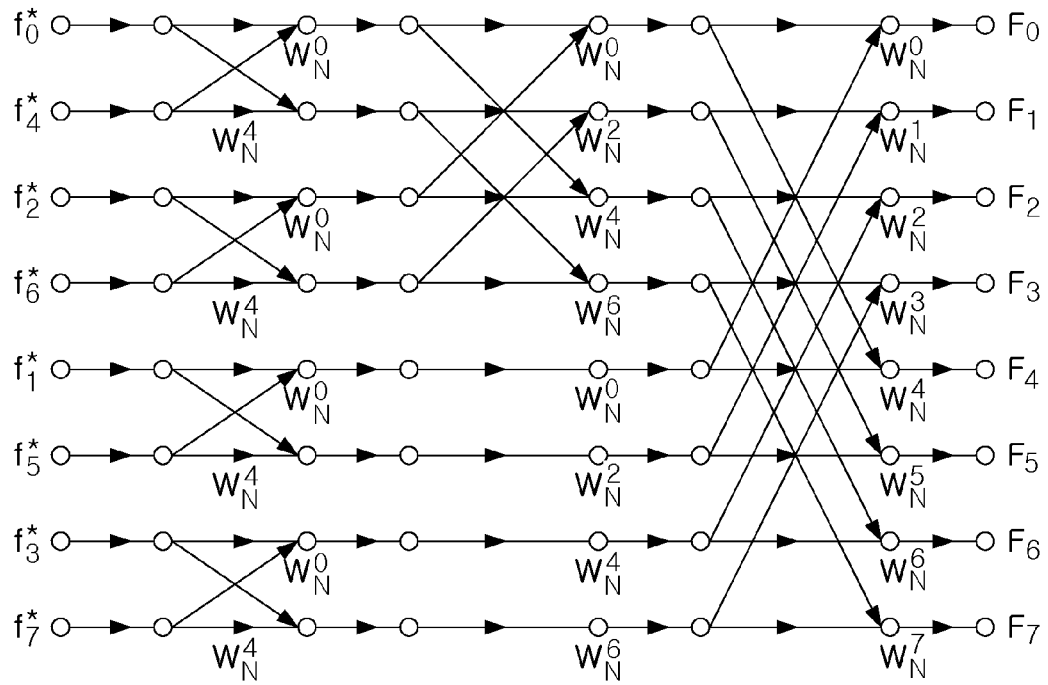
FIG. 17 is a flow chart of a decimation-in-time operation of FFT.
Figure 18:
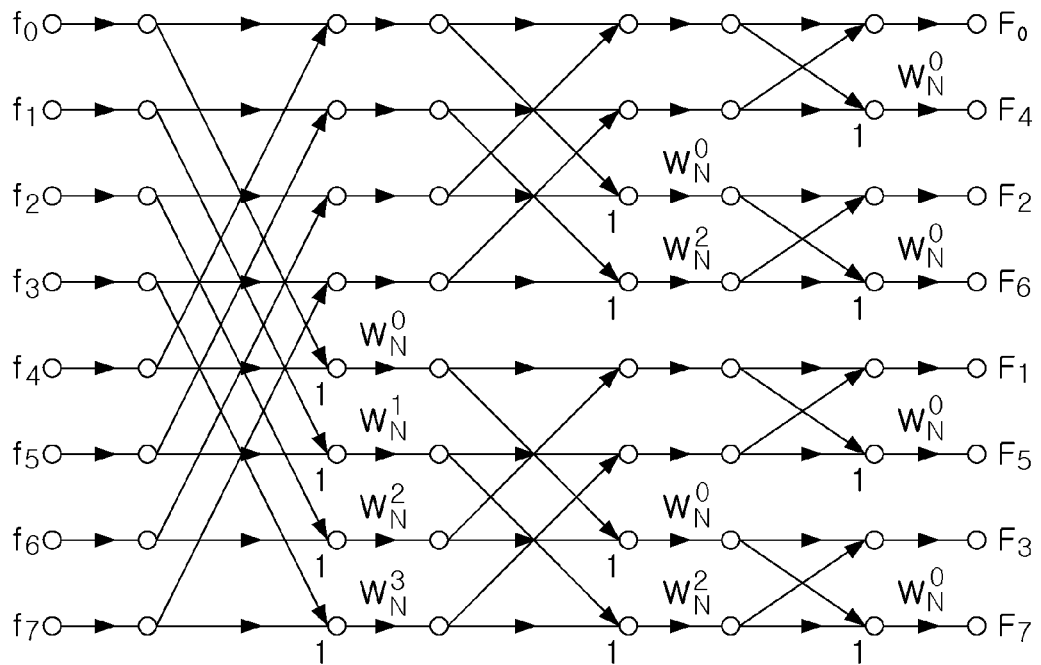
FIG. 18 is a flow chart of a decimation-in-frequency operation of FFT.

FIG. 17 is a flow chart of a decimation-in-time operation of FFT and FIG. 18 is a flow chart of a decimation-in-time operation of FFT.

Figure 19:
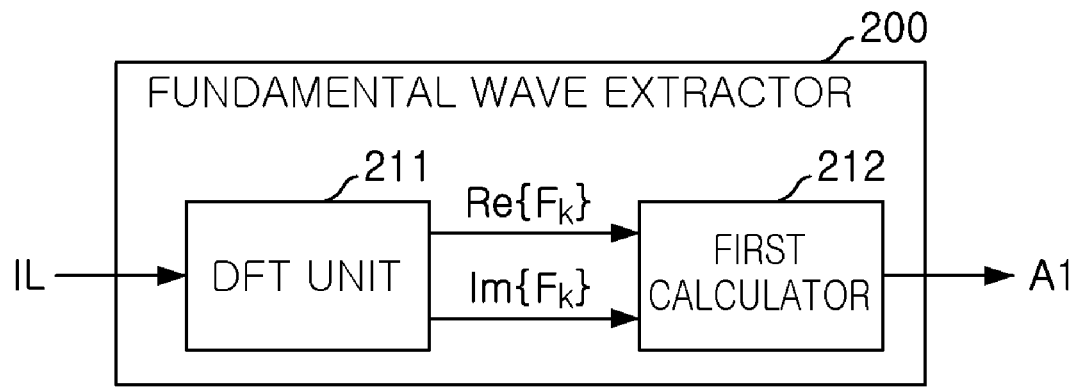
FIG. 19 is a block diagram of a fundamental wave extractor using DFT.

FIG. 19 is a block diagram of a fundamental wave extractor using DFT.

Referring to FIG. 19, the fundamental wave extractor 200 may include a DFT unit 211 that extracts the fundamental wave from the load current IL and a first calculator 212 that detects the magnitude |IL(1)| of the fundamental wave extracted from the DFT unit 211.

Figure 20:
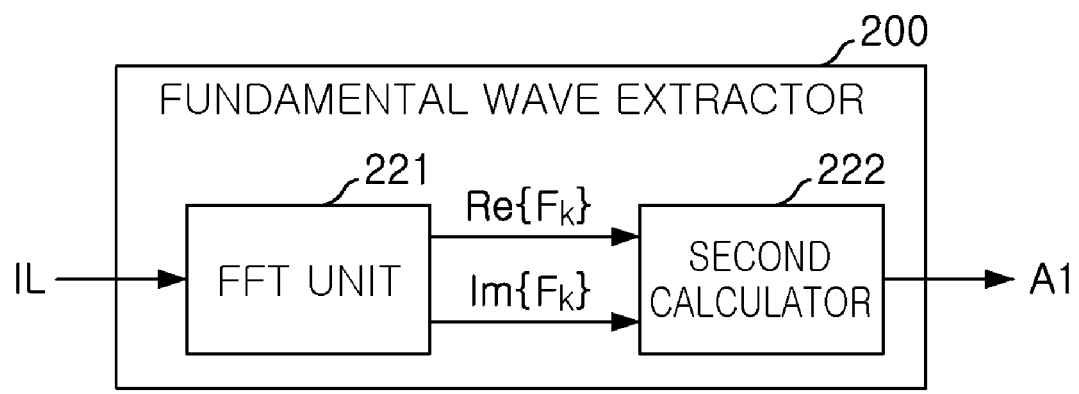
FIG. 20 is a block diagram of a fundamental wave extractor using FFT.

FIG. 20 is a block diagram of a fundamental wave extractor using FFT.

Referring to FIG. 20, the fundamental wave extractor 200 may include a FFT unit 221 that extracts the fundamental wave from the load current IL and a second calculator 222 that detects the magnitude |IL(1)| of the fundamental wave extracted from the FFT unit 221.

Hereinafter, the operations and effects of the present invention will be described in detail with reference to the accompanying drawings.

Describing the apparatus for controlling the power quality of a power generation system according to the present invention with reference to FIGS. 1 to 6, in FIG. 1, the apparatus for controlling the power quality of the present invention can be applied to the power generation system including the DC/DC converter 20 that boosts the DC voltage Vpv from the solar cell 10 to the preset voltage level and follows the maximum power point from the solar cell 10 and the DC/AC inverter 30 that converts the DC voltage into the AC voltage to supply the inverter current Iinv to the grid 40.

In this configuration, the DC/DC converter 20 serves to track the maximum power point (MPPT) from the output of the solar cell 10 variably, according to the insolation and temperature, and serves to extract the maximum power and store it in the DC-link capacitor. The DC-link voltage (for example, 380 [v]) control is performed in the DC/AC inverter 30. When the maximum power of the solar cell 10 is extracted from the DC/DC converter 20, the DC-link voltage is boosted and the DC/AC inverter 30 injects the energy stored in the DC-link end into the grid, thereby controlling the DC-link voltage while lowering the DC-link voltage.

The DC/AC inverter 30 converts the voltage from the DC/DC converter 20 into the AC voltage synchronized with the phase of the grid and supplies it to the grid.

In this case, the grid voltage phase follower 100 included in the apparatus for controlling the power quality of the present invention generates the grid signal Sin(wt) having the phase of the grid voltage Vg and provides it to the second calculator 400.

In addition, the fundamental wave extractor 200 included in the apparatus for controlling the power quality of the present invention extracts the magnitude |IL(1)| of the fundamental wave of the load current IL introduced into the non-linear load 51 connected between the DC/AC inverter 30 and the grid 40 and provides the magnitude |IL(1)| of the fundamental wave of the load current IL to the first calculator 300.

The first calculator 300 subtracts the preset current compensation value ICV from the magnitude |IL(1)| of the fundamental wave from the fundamental wave extractor 200 to generate the grid current instruction value I*g and provides the grid current instruction value I*g to the second calculator 400.

The second calculator 400 generates the output value, the grid current instruction value I*g of the first calculator 300 and the inverter current instruction value I*inv for DC/AC inverter 30 using the grid signal sin(wt) and the load current IL from the grid voltage phase follower 100.

Meanwhile, the apparatus for controlling the power quality of the present invention may further include the controller 500 and the voltage controller 600.

In this case, the controller 500 can control the DC/AC inverter 30 based on the inverter current instruction value I*inv from the second calculator 400.

For example, when the controller 500 includes the current controller 510 and the PWM controller 520, the current controller 510 may detect the inverter current error between the inverter current Iinv and the inverter current instruction value I*inv from the second calculator 400. The PWM controller 520 may generate the PWM inverter signal PWMinv based on the inverter current error from the current controller 510 and control the DC/AC inverter 30 using the PWM inverter signal PWM inv.

In addition, the voltage controller 600 obtains the voltage error between the DC voltage Vdc at the input side of the DC/AC inverter 30 and the preset DC voltage instruction value V*dc and provides the voltage error as the current compensation value ICV.

Referring to FIG. 2, the grid voltage phase follower 100 may include the phase detector 110 and the signal generator 120.

In this configuration, the phase detector 110 detects the phase PH of the grid voltage Vg and provides it to the signal generator 120.

The signal generator 120 may generate the grid signal Sin (wt) that has the same phase as the grid voltage Vg and the preset unit magnitude, based on the phase PH from the phase detector 110.

Referring to FIG. 1, the fundamental wave extractor 200 may be implemented by one of the discrete Fourier transform (DFT), a fast Fourier transform (FFT), and the Goertzel algorithm using the discrete Fourier transform. In this case, the fundamental wave extractor 200 may extract the fundamental wave from the load current IL and detect the magnitude |IL(1)| of the extracted fundamental wave.

First, the case in which the fundamental wave extractor 200 is constituted by the Goertzel algorithm (Goertzel filter) will be described with reference to FIGS. 3 to 6.

As shown in FIG. 3, in the case in which the fundamental wave extractor 200 is constituted by the Goertzel filter, the fundamental wave extractor 200 may detect the magnitude of the fundamental wave IL(1) of the detected load current IL.

In addition, the Goertzel filter shown in FIG. 3, which is a kind of digital filter, receives a signal x[t] of a discrete time to output a discrete frequency spectrum x[k]. Herein, k represents a discrete frequency point, which is obtained by operating only a k integer multiple of a fundamental frequency k0. The Goertzel algorithm applied to the present invention is based on the N-point DFT and may reduce the operations further than the N-point DFT when detecting the magnitude and phase of the frequency component to be extracted.

$$H(z) = \frac{1 - e^{-j\frac{2\pi k}{N}}z^{-1}}{1 - 2\cos\left(\frac{2\pi k}{N}\right)z^{-1} + z^{-2}}$$ Equation 1

$$\frac{k}{N} = \frac{fint}{fs}$$ Equation 2

$$x[n] = v[n] - 2\cos\left(\frac{2\pi k}{N}\right)v[n-1] + v[n-2]$$ Equation 3

$$v[n] = x[n] + 2\cos\left(\frac{2\pi k}{N}\right)v[n-1] - v[n-2]$$ Equation 4

$$y[n] = v[n] - v[n-1]e^{-j\frac{2\pi k}{N}}$$ Equation 5

$$|y[n]|^2 =$$ Equation 6
$$v^2[N-1] + v^2[N-2] - v[N-1]\cdot v[N-2]\cdot 2\cos\left(\frac{2\pi k}{N}\right)$$

Referring to the timing waveform of the Goertzel filter shown in FIG. 4, when the Goertzel filter samples N input signals x[n] for one period of the grid voltage Vg, operates the feedback part (FBP) for each sampling, and operates the feedforward part (FFP) after N-th feedback part (FBP) is operated, the magnitude of the frequency to be extracted may be operated.

Referring to FIGS. 5 and 6, one zero among two poles of the Goertzel filter is offset from the pole, such that only the pole remains. As a result, only the signal corresponding to the discrete frequency k corresponding to the pole passes through the Goertzel filter. The result may be obtained depending on the following 6.

Next, as shown in FIGS. 3 and 19, the fundamental wave extractor 200 may be implemented by the DFT. In this case, the fundamental wave extractor 200 may include the DFT unit 211 and the first calculator 212.

The DFT unit 211 can extract the fundamental wave from the load current IL and detect the magnitude |IL(1)| of the extracted fundamental wave.

When N discrete signals are given, the discrete Fourier transform (DFT) is defined by the following Equation 7.

$$F_k = \sum_{k=0}^{N-1} f_n^* e^{-j2\pi nk/N}$$ Equation 7

$$(k = 0, 1, 2, \ldots, N-1)$$

Meanwhile, a point moving a unit circle circumference on a complex plane by 1/N circumference is assumed to be a twiddle factor, which may be defined by the following Equation 8.

$$W_N = e^{-j2\pi/N}(j=\sqrt{-1})$$ Equation 8

Where in the twiddle factor $W_N^{nk}$, N represents a total number of samplings, n represents current sampling, and k represents a discrete frequency.

The discrete Fourier transform for the twiddle factor of Equation 8 may be represented by Equation 8.

$$F_k = \sum_{k=0}^{N-1} f_n^* W_N^{nk}$$ Equation 9

$$(k = 0, 1, 2, \ldots, N-1)$$

In the above Equation 9, $F_k$ is a complex number representing a magnitude and phase of a harmonic component of an input signal $f_n^*$.

Therefore, the above Equation 9 may be represented as a real number Re and an imaginary number Im as represented by Equations 10 and 11.

$$\text{Re}\{F_k\} = \sum_n x[n]\cos\left(\frac{2\pi k}{N}n\right) \qquad \text{Equation 10}$$

$$\text{Im}\{F_k\} = -\sum_n x[n]\sin\left(\frac{2\pi k}{N}n\right) \qquad \text{Equation 11}$$

As represented by Equations 10 and 11, the first calculator 212 shown in FIG. 19 may operate the magnitude of the harmonic component extracted using the real number Re and the imaginary number Im depending on the following Equation 12.

$$A_k = |F_k| = \sqrt{Re(F_k)^2 + Im(F_k)^2} \qquad \text{Equation 12}$$

As described above, the magnitude of the fundamental wave of the load current to be extracted using the DFT may be extracted through the Equation 13.

Next, as shown in FIGS. 3 and 17 and FIGS. 18 and 20, the fundamental wave extractor 200 may be implemented by the FFT. In this case, as shown in FIG. 20, the fundamental wave extractor 200 may include the FFT unit 221 and the second calculator 222.

The FFT unit 221 can extract the fundamental wave from the load current IL and extract the magnitude |IL(1)| of the extracted fundamental wave.

If N discrete signals $f_n^*$ (n=0, 1, . . . , N−1) are given, the discrete Fourier transform (DFT) of $f_n^*$ may be defined by Equation 13.

$$F_k = \sum_{k=0}^{N-1} f_n^* e^{-j2\pi nk/N} \qquad \text{Equation 13}$$

$$(k = 0, 1, 2, \ldots, N-1)$$

When the discrete Fourier transform shown in Equation 13 is used, a point moving the unit circle circumference on the complex plane by 1/N circumference is assumed to be a twiddle factor, which may be defined by the following Equation 14.

$$W_N = e^{-j2\pi/N} (j=\sqrt{-1}) \qquad \text{Equation 14}$$

In Equation 14, $W_N^{nk}$ represents a twiddle factor, N represents a total number of samplings, n represents current sampling, and k represents a discrete frequency.

The discrete Fourier transform for the twiddle factor of Equation 14 may be represented by the following Equation 15.

$$F_k = \sum_{k=0}^{N-1} f_n^* W_N^{nk} \qquad \text{Equation 15}$$

$$(k = 0, 1, 2, \ldots, N-1)$$

Fk is a complex number representing the magnitude and phase of harmonic components of $f_n^*$ of the input signal. Therefore, the complex number may be represented as a real number Re and an imaginary number Im as represented by Equations 16 and 17. In this case, the twiddle factor $W^{nk}$ has repeated specific periodicity.

$$W^{kn} = W^{(k+N)n} \qquad \text{Equation 16}$$

For example, a group of odd numbers of the twiddle factor is repeated and a group of even numbers of the twiddle factor is repeated. Therefore, it can be appreciated that the FFT fast performs operations by reducing the repeated operations in the twiddle factor of the DFT. Therefore, the twiddle factor of the Equation 16 may be represented by the following Equation 17.

$$F_k = \sum_{k=0}^{N-1} f_n^* W_N^{nk} \qquad \text{Equation 17}$$

$$= \sum_{k \text{ even}} f_n^* W_N^{nk} + \sum_{k \text{ odd}} f_n^* W_N^{nk}$$

$$(k = 0, 1, 2, \ldots, N-1)$$

In Equation 17, when n is an even number, n=2r and when n is an odd number, n=2r+1, which depends on the following Equations 18, 19, and 20.

$$F_k = \sum_{r=0}^{(N/2)-1} f_{(2r)}^* W_N^{2rk} + \sum_{r=0}^{(N/2)-1} f_{(2r+1)}^* W_N^{(2r+1)k} \qquad \text{Equation 18}$$

$$= \sum_{r=0}^{(N/2)-1} f_{(2r)}^* (W_N^2)^{rk} + W_N^k \sum_{r=0}^{(N/2)-1} f_{(2r+1)}^* (W_N^2)^{rk}$$

$$= \sum_{r=0}^{(N/2)-1} f_{(2r)}^* W_{N/2}^{rk} + W_N^k \sum_{r=0}^{(N/2)-1} f_{(2r+1)}^* W_{N/2}^{rk}$$

$$= G_k + W_N^k H_k$$

$$(k = 0, 1, \ldots, N-1)$$

$$G_k = \sum_{r=0}^{(N/2)-1} f_{(2r)}^* W_{N/2}^{rk} \qquad \text{Equation 19}$$

$$\left(k = 0, 1, \ldots, \frac{N}{2} - 1\right)$$

$$H_k = \sum_{r=0}^{(N/2)-1} f_{(2r+1)}^* W_{N/2}^{rk} \qquad \text{Equation 20}$$

$$\left(k = 0, 1, \ldots, \frac{N}{2} - 1\right)$$

Meanwhile, referring to FIGS. 17 and 18, the fast Fourier transform (FFT) has two types, decimation-in-time and decimation-in-frequency. Decimation-in-time is aligned according to time and decimation-in-frequency is aligned according to frequency. Each operation is the same.

Generally, the FFT reduces the operations using a butterfly operation. FIG. 17 is a flow chart of a butterfly operation of a decimation-in-time FFT. It can be appreciated from FIG. 17 that the extracted frequency components are arranged in order. FIG. 18 is a flow chart of a butterfly operation of a decimation-in-frequency FFT. It can be appreciated from FIG. 18 that the components in a time-domain are arranged in order. The frequency components extracted in this type may be represented by a real number Re and an imaginary number Im as represented by the following Equations 21 and 22.

$$\text{Re}\{F_k\} = \sum_n x[n]\cos\left(\frac{2\pi k}{N}n\right) \qquad \text{Equation 21}$$

$$\text{Im}\{F_k\} = -\sum_n x[n]\sin\left(\frac{2\pi k}{N}n\right) \qquad \text{Equation 22}$$

As represented by Equations 21 and 22, the second calculator 222 shown in FIG. 19 may operate the magnitude and phase of the harmonic component extracted using the real number Re and the imaginary number Im depending on the following Equation 23.

$$A_k = |F_k| = \sqrt{Re(F_k)^2 + Im(F_k)^2} \qquad \text{Equation 23}$$

As described above, the magnitude of the fundamental wave of the load current to be extracted using the FFT may be extracted through Equation 23.

On the other hand, when the DFT is directly operated, in order to obtain all $F_k$, the complex operation is needed to perform product $N \times N = N^2$ times and addition $N(N-1)$ times. As N is large, the operation is remarkably increased.

On the other hand, the FFT completes the operation when the product is performed $(N \log_2 N)/2$ times and the addition is performed $2 \log 2N$ times.

In particular, an operation time to perform operations using a computer substantially depends on the frequency of product, such that as the N value is large, the use of the FFT is more efficient than the DFT. The output is divided into a real number and an imaginary number, thereby making it possible to obtain the magnitude and phase of the frequency to be extracted.

Referring back to FIG. 1, when the second calculator 400 includes a multiplier 410 and a subtracter 420, the multiplier 410 multiples the output value of the first calculator 300 by the grid signal from the grid voltage phase follower 100 and provides it to the subtracter 420.

The subtracter 420 subtracts the output signal of the multiplier 410 from the load current IL to generate the inverter current instruction value I*inv and provide it to the current controller 510 of the controller 500.

The method for controlling the power quality of a power generation system according to the present invention will now be described with reference to FIGS. 1, 7 to 10.

In FIGS. 1 and 6, the power generation system to which the method for controlling the power quality of the present invention is applied may includes the DC/DC converter 20 that boosts the DC voltage Vpv from the solar cell 10 to a preset voltage level and follows the maximum power point from the solar cell 10 and the DC/AC inverter 30 that converts the DC voltage into the AC voltage and supplies the inverter current Iinv to the grid 40.

Describing the method for controlling the power quality of the present invention applied to the power generation system, the grid signal generating step (S100) of the present invention generates the grid signal Sin (wt) having the phase of the grid voltage Vg and provides it to the second operating step (S400).

Next, the fundamental wave extracting step (S200) of the present invention extracts the magnitude |IL(1)| of the fundamental wave of the load current IL introduced into the non-linear load 50 connected between the DC/AC inverter 30 and the grid 40 and provides it to the first operating step (S300).

The first operating step (S300) subtracts the preset current compensation value ICV from the magnitude |IL(1)| of the fundamental wave from the fundamental wave extracting step (S200) and provides it to the second operating step (S400).

The second operating step (S400) generates the inverter current instruction value I*inv for the DC/AC inverter 30 by using the output value of the first operating step (S300) and the grid signal and the load current IL from the grid signal generating step (S100).

In addition, referring to FIG. 7, when the method for controlling the power quality of the present invention includes the controlling step (S500) and the voltage controlling step (S600), the controlling step (S500) controls the DC/AC inverter 30 based on the inverter current instruction value I*inv from the second operating step (S400).

In addition, the voltage controlling step (S600) obtains the voltage error between the DC voltage Vdc at the input side of the DC/AC inverter 30 and the preset DC voltage instruction value V*dc and provides the voltage error as the current compensation value ICV.

In more detail, when the controlling step (S500) includes the current controlling step (S510) and the PWM controlling step (S520), the current controlling step (S510) may detect the inverter current error between the inverter current Iinv and the inverter current instruction value I*inv from the second operating step (S400) and provide it to the PWM controlling step (S520).

The PWM controlling step (S500) provides the PWM inverter signal PWMinv for controlling the DC/AC inverter 30 based on the inverter current error from the current controlling step (S510).

Referring to FIG. 8, when the grid signal generating step (S100) includes the phase detecting step (S110) and the signal generating step (S120), the phase detecting step (S110) detects the phase PH of the grid voltage Vg and provides it to the signal generating step (S120).

The signal generating step (S120) may generate the grid signal Sin (wt) that has the same phase as the grid voltage Vg and the preset unit magnitude, based on the phase PH from the phase detecting step (S110).

Referring to FIG. 9, the fundamental wave extracting step (S200) may be performed by the Goertzel algorithm using the discrete Fourier transformation DFT and may extract the fundamental wave from the load current IL and detect the magnitude |IL(1)| of the extracted fundamental wave (S210).

In this case, the fundamental wave extracting step (S200) may be performed to have the transfer function Hz as represented by the above Equation 1.

In more detail, the fundamental wave extracting step S200 may have the feedback part FBP and the feedforward part (FFP) and detect the magnitude of the fundamental wave IL(1) of the load current IL by using the feedback part (FBP) and the feedforward part (FFP).

Referring to FIG. 10, when the second operating step (S400) includes the multiplying step (S410) and the adding step (S420), the multiplying step (S410) multiplies the output value of the first operating step (S300) by the grid signal from the grid signal generating step (S100) and provides it to the adding step (S420).

The adding step (S420) subtracts the output signal of the multiplying step (S410) from the load current IL to generate the inverter current instruction value I*inv.

Hereinafter, the example of the power generation system according to the related art and the power generation system according to the present invention will be described with reference to FIGS. 11 to 16.

First, referring to FIGS. 11 and 12, the distortion occurs in the grid current Ig and the load current Iload at the time of connecting the non-linear loads to the power generation system according to the related art, such that it can be appreciated that the power quality is poor.

That is, as shown in FIG. 11, referring to the waveform diagram of the main signal of the power generation system according to the present invention without the active power filter (APF) function, when the non-linear loads are connected at 0.6 [S] during the power generation, it can be appreciated that distortion occurs in the grid current due to the influence of the non-linear load after 0.6 [s] referring to the grid voltage Vg and the grid current Ig shown in FIG. 11A. FIG. 11B shows the waveform of the grid current and FIG. 11C shows the load current Iload flowing into the non-linear loads. Referring to the inverter current Iinv shown in FIG. 11D, the inverter current Iinv is synchronized with the phase of the grid voltage as a power factor 1. Referring to the DC-link voltage at the input side of the DC/AC inverter 30 shown in FIG. 11E, the DC voltage Vdc has a ripple of 120 Hz and show DC 380 [V]. It can be appreciated that FIG. 11F shows that the PV voltage Vpv of the solar cell 10 is output as 3 kW and the grid power Pg is −3 kW. FIG. 11F shows a shape that the load power Pload consumed at the non-linear load at 0.6 [S] is increased from 1 kW to 2 Kw.

In addition, referring to the frequency components of the grid current Ig shown in FIG. 12A among the graphs showing the results of analyzing the frequency components of each current, it can be appreciated that the grid current Ig includes a plurality of harmonic components other than the fundamental wave, such that the grid current is distorted due to the non-linear load, thereby degrading the power quality. Referring to the frequency components of the load current Iload shown in FIG. 12B, it can be appreciated that the load current also includes the plurality of harmonic components, which has a bad effect on the grid. Referring to the frequency components of the inverter current Iinv shown in FIG. 12C, it can be appreciated that the inverter current Iinv outputs only the current of the fundamental wave component.

On the other hand, referring to FIGS. 13 and 14, the power generation system to which the present invention is applied does not cause the distortion in the grid current at the time of connecting the non-linear loads, thereby preventing the power quality from being degraded.

That is, FIG. 13 shows a main waveform of the power generation system to which the present invention is applied when insolation is present.

Referring to the grid voltage Vg and the grid current Ig shown in FIG. 13A, it can be appreciated that the grid current Ig is not distorted even when the non-linear loads are connected. FIG. 13B shows the non-distorted grid current Ig FIG. 13C shows the waveform of the load current Iload flowing into the non-linear loads. Referring to the inverter current Iinv shown in FIG. 13D, it can be appreciated that components compensating for the distortion due to the non-linear load are added to the fundamental wave after 0.6 [s] in the inverter current Iinv. Referring to FIG. 13E, it can be appreciated that the output power Ppv of the solar cell 10 is 3 kw and the grid power Pg flowing to the grid is −3 [Kw] and the load power Pload consumed at the non-linear load is increased to 2 [kW] by the load power Pload at 0.6 [s].

As shown in FIG. 14, referring to a graph showing the results of analyzing frequency components of each current, since the current distortion due to the non-linear load is compensated in the present invention by referring to the frequency component of the grid current shown in FIG. 14A, it can be appreciated that the grid current does not have the distortion due to the non-linear load and shows only the fundamental wave components. Referring to the frequency components of the load current shown in FIG. 14B, it can be appreciated that the load current includes many harmonic components and is thus distorted. Referring to the inverter current Iinv and the distortion current compensating harmonics shown in FIG. 14C, it can be appreciated that the harmonic components included in the grid current Ig moves to the inverter current Iinv. According, the distortions do not occur in the system current.

Further, referring to FIGS. 15 and 16, when power generation is not performed in a night mode when insolation is absent, it can be appreciated that the power generation system to which the present invention is applied does not cause distortion in the grid current even when the non-linear loads are connected, thereby preventing power quality from being degraded.

That is, in the power generation system to which the present invention is applied, FIG. 15 shows the waveform when insolation is absent. When insolation is absent like night, the power generation system of the present invention does not generate power and performs only the AFP function. The power generation system repeatedly performs the charging and discharging by using the DC-link capacitor connected to the input terminal of the DC/AC inverter to show the shape of compensating for current distortion due to the non-linear load, such that the grid current Ig is also not distorted.

That is, referring to the grid voltage Vg and the grid current Ig of FIG. 15A, the grid voltage and the grid current is shown as a reverse phase to each other since the grid voltage Vg is supplied to the non-linear load. The distortion of the grid current is not shown due to the AFP function of the present invention. FIG. 15B shows the waveform of the grid current. FIG. 15C shows the current waveform of the non-linear load. FIG. 15D shows that the output current Iinv of the inverter compensates for the distortion of the grid current. FIG. 15E shows the DC-link voltage at the input side of the DC/AC inverter. Referring to each power shown in FIG. 15F, the output power Ppv of the solar cell 10 is not shown in the night mode and only the grid power Pg is supplied to the non-linear load of 1 [Kw].

Further, as shown in FIG. 16, referring to the graph showing the results of analyzing the frequency components of each current, FIG. 11A shows only the fundamental wave component of the grid current. Therefore, the power quality is not degraded. FIG. 16B shows the harmonic component in the current flowing into the non-linear load according to the non-linear load. FIG. 16C shows the harmonic component compensating for the distortion of the grid current. Since the power generation is not performed in the night mode, the frequency of the fundamental wave component is not shown.

In the present invention as described above, there is no need to additionally install the power quality device, the active power filter (AFP) other than the distributed power supply by adding the load current detecting circuit to the existing grid interconnected system and adding the power quality control (PQC) algorithm thereto to perform the APF function, such that the present invention has economical and spatial advantages.

The solar power generation system is used both in day and night, such that the usage rate thereof may be 100%.

The present invention can perform the fast operation by remarkably reducing operations due to a simple operation using the Goertzel algorithm for current since it only requires the load current detecting circuit, as compared to the method of obtaining the root mean square (RMS) value of voltage and current according to the related art.

As set forth above, it is possible to compensate for the harmonic distortions due to the non-linear loads and improve the power quality accordingly, by performing the active power filter function regardless of whether or not the power generation system performs power generation.

While the present invention has been shown and described in connection with the exemplary embodiments, it will be apparent to those skilled in the art that modifications and variations can be made without departing from the spirit and scope of the invention as defined by the appended claims.

What is claimed is:

1. An apparatus for controlling the power quality of a power generation system including a DC/AC inverter converting DC voltage into AC voltage and supplying inverter current to a grid, comprising:
   a grid voltage phase follower generating a grid signal having a phase of the grid voltage;
   a fundamental extractor extracting a magnitude of a fundamental wave of a load current introduced into a non-linear load connected between the DC/AC inverter and the grid;
   a first calculator subtracting a preset current compensation value from the magnitude of the fundamental wave from the fundamental extractor; and
   a second calculator generating an inverter current instruction value for the DC/AC inverter by using the output value of the first calculator and the grid signal and the load current from the grid voltage phase follower.

2. The apparatus for controlling the power quality of a power generation system of claim 1, wherein the grid voltage phase follower includes:
   a phase detector detecting the phase of the grid voltage; and
   a signal generator generating the grid signal having the same phase as the grid voltage and having the preset unit magnitude based on the phase from the phase detector.

3. The apparatus for controlling the power quality of a power generation system of claim 1, wherein the fundamental wave extractor is implemented by one of the discrete Fourier transform (DFT), a fast Fourier transform (FFT), and the Goertzel algorithm using the discrete Fourier transform to extract the fundamental wave from the load current and detect the magnitude of the extracted fundamental wave.

4. The apparatus for controlling the power quality of a power generation system of claim 3, wherein the fundamental wave extractor has a transfer function H(z) as the following Equation, $$H(z) = \frac{1 - e^{-j\frac{2\pi k}{N}} z^{-1}}{1 - 2\cos\left(\frac{2\pi k}{N}\right) z^{-1} + z^{-2}}$$ Equation (where, k represents a discrete frequency and N is the number of samplings for one period of a grid voltage).

5. The apparatus for controlling the power quality of a power generation system of claim 1, wherein the second calculator includes:
   a multiplier multiplying an output value of the first calculator by the grid signal from the grid voltage phase follower; and
   a subtracter subtracting the output signal of the multiplier from the load current to generate the inverter current instruction value.

6. The apparatus for controlling the power quality of a power generation system of claim 1, further comprising a voltage controller obtaining the voltage error between the DC voltage at the input side of the DC/AC inverter and the preset DC voltage and providing the voltage error as the compensation value.

7. An apparatus for controlling the power quality of a power generation system including a DC/AC inverter converting DC voltage into AC voltage and supplying inverter current to a grid, comprising:
   a grid voltage phase follower generating a grid signal having a phase of the grid voltage;
   a fundamental extractor extracting a magnitude of a fundamental wave of a load current introduced into a non-linear load connected between the DC/AC inverter and the grid;
   a first calculator subtracting a preset current compensation value from the magnitude of the fundamental wave from the fundamental extractor;
   a second calculator generating an inverter current instruction value for the DC/AC inverter by using the output value of the first calculator and the grid signal and the load current from the grid voltage phase follower; and
   a controller controlling the DC/AC inverter based on the inverter current instruction value from the second calculator.

8. The apparatus for controlling the power quality of a power generation system of claim 7, wherein the grid voltage phase follower includes:
   a phase detector detecting the phase of the grid voltage; and
   a signal generator generating the grid signal having the same phase as the grid voltage and having the preset unit magnitude based on the phase from the phase detector.

9. The apparatus for controlling the power quality of a power generation system of claim 7, wherein the fundamental wave extractor is implemented by one of the discrete Fourier transform (DFT), a fast Fourier transform (FFT), and the Goertzel algorithm using the discrete Fourier transform to extract the fundamental wave from the load current and detect the magnitude of the extracted fundamental wave.

10. The apparatus for controlling the power quality of a power generation system of claim 9, wherein the fundamental wave extractor has a transfer function H(z) as the following Equation, $$H(z) = \frac{1 - e^{-j\frac{2\pi k}{N}} z^{-1}}{1 - 2\cos\left(\frac{2\pi k}{N}\right) z^{-1} + z^{-2}}$$ Equation (where, k represents a discrete frequency and N is the number of samplings for one period of a grid voltage).

11. The apparatus for controlling the power quality of a power generation system of claim 7, wherein the second calculator includes:
   a multiplier multiplying an output value of the first calculator by the grid signal from the grid voltage phase follower; and
   a subtracter subtracting the output signal of the multiplier from the load current to generate the inverter current instruction value.

12. The apparatus for controlling the power quality of a power generation system of claim 7, further comprising a voltage controller obtaining the voltage error between the DC voltage at the input side of the DC/AC inverter and the preset DC voltage and providing the voltage error as the compensation value.

13. A method for controlling the power quality of a power generation system including a DC/AC inverter converting DC voltage into AC voltage and supplying inverter current to a grid, comprising:
   a grid signal generating step generating a grid signal having a phase of the grid voltage;
   a fundamental wave extracting step extracting a magnitude of a fundamental wave of a load current introduced into a non-linear load connected between the DC/AC inverter and the grid;

a first operating step subtracting a preset current compensation value from the magnitude of the fundamental wave from the fundamental wave extracting step; and a second operating step generating an inverter current instruction value for the DC/AC inverter by using the output value of the first operating step and the grid signal and the load current from the grid signal generating step.

14. The method for controlling the power quality of a power generation system of claim 13, wherein the grid signal generating step includes:

a phase detecting step detecting the phase of the grid voltage; and a signal generating step generating the grid signal having the same phase as the grid voltage and having the preset unit magnitude based on the phase from the phase detecting step.

15. The method for controlling the power quality of a power generation system of claim 13, wherein the fundamental wave extracting step is implemented by one of the discrete Fourier transform (DFT), a fast Fourier transform (FFT), and the Goertzel algorithm using the discrete Fourier transform to extract the fundamental wave from the load current and detect the magnitude of the extracted fundamental wave.

16. The method for controlling the power quality of a power generation system of claim 15, wherein the fundamental wave extracting step has a transfer function H(z) as the following Equation, $$H(z) = \frac{1 - e^{-j\frac{2\pi k}{N}} z^{-1}}{1 - 2\cos\left(\frac{2\pi k}{N}\right) z^{-1} + z^{-2}} \quad \text{Equation}$$

(where, k represents a discrete frequency and N is the number of samplings for one period of a grid voltage).

17. The method for controlling the power quality of a power generation system of claim 13, wherein the second operating step includes:

a multiplying step multiplying an output value of the first calculating step by the grid signal from the grid signal generating step; and an adding step subtracting the output signal of the multiplying step from the load current to generate the inverter current instruction value.

18. The method for controlling the power quality of a power generation system of claim 13, further comprising a controlling step controlling the DC/AC inverter based on the inverter current instruction value from the second operating step.

19. The method for controlling the power quality of a power generation system of claim 18, wherein the controlling step includes:

a current controlling step detecting an inverter current error between the inverter current and the inverter current instruction value from the second operating step; and a PWM controlling step providing a PWM inverter signal for controlling the DC/AC inverter based on the inverter current error from the current controlling step.

20. The method for controlling the power quality of a power generation system of claim 13, further comprising a voltage controlling step obtaining the voltage error between the DC voltage at the input side of the DC/AC inverter and the preset DC voltage and providing the voltage error as the compensation value.

* * * * *